(12) United States Patent
McCasland

(10) Patent No.: US 7,555,545 B2
(45) Date of Patent: Jun. 30, 2009

(54) METHOD SYSTEM AND STORAGE MEDIUM FOR DETECTING NETWORK ELEMENTS

(75) Inventor: Paul McCasland, Lafayette, LA (US)

(73) Assignee: AT&T Intellectual Property, I,L.P, Wilmington, DE (US)

( * ) Notice: Subject to any disclaimer, the term of this patent is extended or adjusted under 35 U.S.C. 154(b) by 1042 days.

(21) Appl. No.: 10/631,437

(22) Filed: Jul. 30, 2003

(65) Prior Publication Data
US 2005/0027855 A1    Feb. 3, 2005

(51) Int. Cl.
*G06F 15/173* (2006.01)

(52) U.S. Cl. .................. 709/224; 709/223; 370/254

(58) Field of Classification Search .............. 709/220, 709/222, 223–224
See application file for complete search history.

(56) References Cited

U.S. PATENT DOCUMENTS

| | | | | |
|---|---|---|---|---|
| 5,559,955 A | * | 9/1996 | Dev et al. | 714/4 |
| 5,751,933 A | * | 5/1998 | Dev et al. | 714/4 |
| 6,044,407 A | * | 3/2000 | Jones et al. | 709/246 |
| 6,049,828 A | * | 4/2000 | Dev et al. | 709/224 |
| 6,170,005 B1 | * | 1/2001 | Meandzija | 709/217 |
| 6,363,421 B2 | * | 3/2002 | Barker et al. | 709/223 |
| 6,529,894 B1 | * | 3/2003 | Haeri et al. | 707/1 |
| 6,708,207 B1 | * | 3/2004 | Sabelhaus et al. | 709/223 |
| 6,963,911 B2 | * | 11/2005 | Gebhardt Jr. et al. | 709/223 |
| 6,990,601 B1 | * | 1/2006 | Tsuneya et al. | 714/4 |
| 7,024,476 B1 | * | 4/2006 | Page et al. | 709/224 |
| 7,043,727 B2 | * | 5/2006 | Bennett et al. | 718/100 |
| 7,131,031 B2 | * | 10/2006 | Brundridge et al. | 714/25 |
| 2002/0027569 A1 | * | 3/2002 | Manni et al. | 345/764 |
| 2002/0099814 A1 | * | 7/2002 | Mastrianni | 709/224 |

* cited by examiner

*Primary Examiner*—Larry D Donaghue
*Assistant Examiner*—Jeffrey R Swearingen
(74) *Attorney, Agent, or Firm*—Cantor Colburn LLP

(57) ABSTRACT

A method of detecting network information. The method involves generating a polling command and issuing the polling command to a network element. A network element identifier generated by the network element is received in response to the polling command. A database is accessed and it is determined whether the network element identifier is present in the database. A communication protocol is obtained for the network element in response to accessing the database. The communication protocol is used to retrieve network element information from the network element. The network element information is stored in the database.

18 Claims, 3 Drawing Sheets

H1000624

| | | | | | | | | Last Updated: 6/13/02 |
|---|---|---|---|---|---|---|---|---|
| 003 | H1000624 | | Contact Douglas Reinsch | LAN Ckt ID ? | Chassis Type: MMAC8 | Chassis Regional: H1000624 | Chassis Node: a6064018 | Card Type: TPRMM-22 | Card Channel: B |
| CLL/Code | | | Phone: 972-3001 | LAN IP Net # 90.18.164.0 | Chassis Mfg.: Cabletron | Chassis Location: 1E24 | | Card Owner: BST | Card IP: |
| Address: 3196 Hwy. 280 So. Birmingham AL | | | Data: | LAN Broadcast IP 90.18.179.255 | Chassis Owner: BST | Chassis Logical: bit 15450 | | Card Logical: | Card Node: |
| Floor 1st | | | | LAN Bitmask: 255.255.240.0 | Chassis Ckt ID | Chassis/Stack/IP: 90.18.64.18 | | Card Notes: | |
| | | | App/Group BITS | VCSN Ckt ID 1CLA07506534 | Dialstring/M/B/P bs205/bsbrhm12/bsalrt34 | | | | |

| Port | Patch Panel | To BB Delivery Location | Cube# | User | To Device IPX Name | Host | To Logical | To Device IP | To MAC | To Node | To Regional | Notes | Acquired By |
|---|---|---|---|---|---|---|---|---|---|---|---|---|---|
| 012 | AB44 | 1EAB44 | | | | | | | | | | | |
| 013 | AB43 | 1EAB43 | | | Lexmark Ptr | | bit19966 | 90.18.65.128 | | a8055128 | | | |
| 014 | AB42 | 1EAB42 | | | Compaq PC | | bit20016 | 90.18.65.175 | | a8055175 | | | |

*FIG. 3*

METHOD SYSTEM AND STORAGE MEDIUM FOR DETECTING NETWORK ELEMENTS

BACKGROUND OF THE INVENTION

The present invention relates generally to network management and in particular to a method, system and storage medium for detecting network elements and maintaining an inventory of network elements.

Networks such as local area networks (LANs) and wide area networks (WANs) may include a high number of network elements such as personal computers, printers, hubs, routers, switches, etc. Maintaining an inventory of various network elements and the interconnection of the network elements is a daunting task. Existing applications provide network discovery, but only certain types and manufacturers of network devices are supported. Thus, there is a need for a network element detection system that supports all types of network elements.

SUMMARY OF THE INVENTION

Embodiments of the invention include a method of detecting network information. The method involves generating a polling command and issuing the polling command to a network element. A network element identifier generated by the network element is received in response to the polling command. A database is accessed and it is determined whether the network element identifier is present in the database. A communication protocol is obtained for the network element in response to accessing the database. The communication protocol is used to retrieve network element information from the network element. The network element information is stored in the database.

BRIEF DESCRIPTION OF THE DRAWINGS

Referring to the exemplary drawings wherein like elements are numbered alike in the accompanying Figures:

FIG. 3 depicts exemplary network documentation.

DETAILED DESCRIPTION OF THE INVENTION

Figure 1:
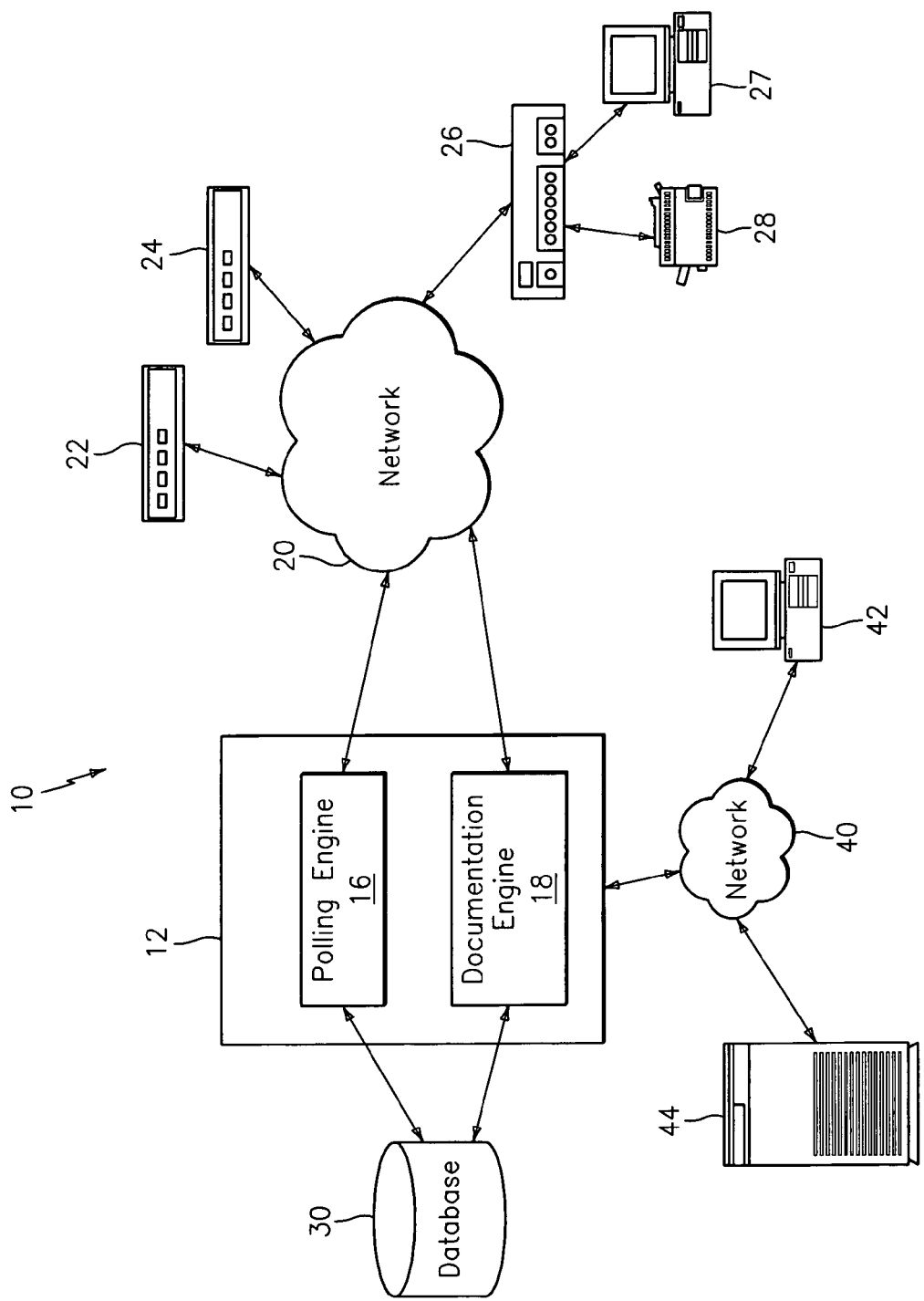
FIG. 1 depicts an exemplary system for implementing embodiments of the invention.

FIG. 1 depicts an exemplary system 10 for implementing embodiments of the invention. System 10 includes a network element detection system 12 that implements a polling engine 16 and a documentation engine 18. The network element detection system 12 may be implemented using a server that executes computer program(s) to implement the polling engine 16 and documentation engine 18. Network element detection system 12 is coupled to a network 20 which represents the network for which network element discovery is needed. Network 20 may be a LAN, WAN or other type of network, or comprise multiple sub networks and may span across multiple geographically disperse locations. Further, all or part of network 20 may be a wireless network. Various network elements are part of network 20 such as router 22, switch 24 and hub 26 which serve as network traffic devices. Other network elements are end devices, connected to network traffic devices, such personal computer 27, printer 28, etc. It is understood that a variety of network elements may be part of network 20.

The network element detection system 12 is also connected to another network 40 that provides a communication medium for network element detection system 12 with server 44 and user system 42. In an exemplary embodiment, network 40 is the Internet. A user at user system 42 may request network documentation describing network 20. Further, network element detection system 12 may contact server 44 to obtain a network element communication protocol as described in further detail herein.

A database 30 is coupled to network element detection system 12 and may be a separate physical device or part of network element detection system 12. Database 30 may also be remotely located from network element detection system 12. Database 30 contains data pertaining to a variety of network elements. A network element identifier is stored in database 30 which identifies the type of network element. Associated with each network element identifier is a network element communication protocol that defines how polling engine 16 retrieves network element information from a network element.

Figure 2:
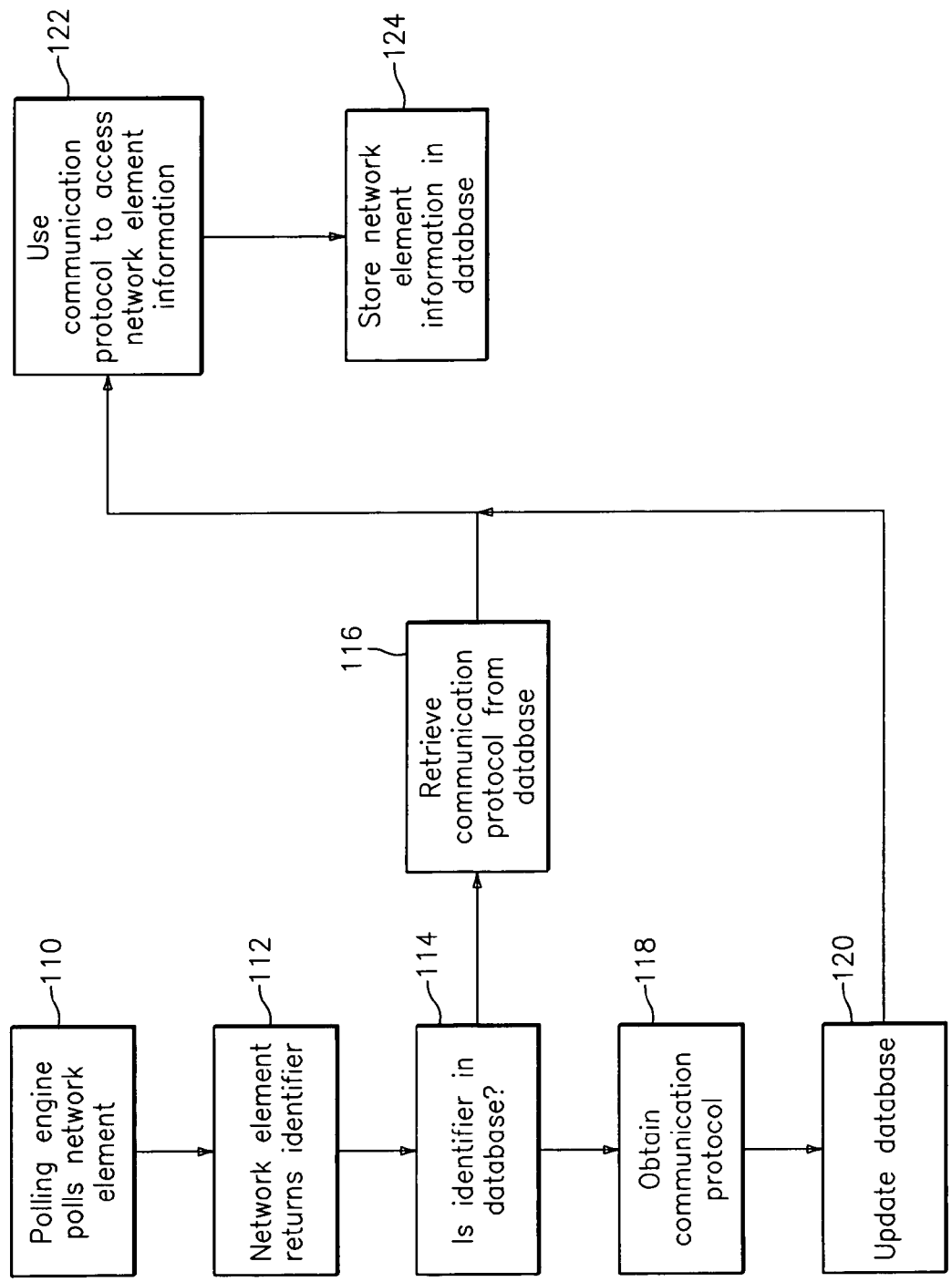
FIG. 2 is a flowchart of an exemplary process for detecting network element information.

FIG. 2 is flowchart of an exemplary method for detecting network elements and retrieving network element information. The process begins at step 110 where polling engine 16 polls a network element on network 20 to obtain a network identifier. The polling engine 16 may periodically send polling commands on network 20 to monitor network information. Alternatively, step 110 may be initiated upon a certain event, such as detection of installation of a new network element on the network 20.

Each network element includes a network identifier that is accessible upon the polling engine issuing a polling command. In an embodiment of the invention, the polling command from polling engine 16 is an SNMP formatted command. Network elements on network 20 are designed to respond to the initial polling command with a network element identifier. For example, a response to a polling command may be a brief message indicating the System Object Identifier (SYSOID) of the network element (e.g., "1.3.6.1.4.1.2272.30", a Nortel Passport Router model 8600). At step 112, the network element replies with the network element identifier to the polling engine 16.

At step 114, polling engine 16 determines whether the network identifier returned from the network element is stored in database 30. For example, network element detection system 12 determines if "1.3.6.1.4.1.2272.30" appears in database 30. If so, flow proceeds to step 116 where the communication protocol for the network element is retrieved from database 30. The communication protocol identifies how to retrieve network element information from a network element. The communication protocol may include commands needed to interface with the network element, formats of data within the network element and storage locations of data within the network element.

If the network element identifier is not present in database 30, flow proceeds to step 118 where the communication protocol is obtained. This may be performed manually by an operator using reference manuals, contacting the manufacturer of the network element, etc. The network element detection system 12 may automatically notify an operator (e.g., generate an e-mail) when a network element identifier is not found in database 30. The notification includes the network element identifier.

Alternatively, network element detection system 12 accesses the communication protocol automatically by contacting a server 44 containing the communication protocol. In this scenario, the network element responds to the polling command by providing a network element identifier that includes a URL where the communication protocol may be accessed. For example, the network element may respond "1.3.6.1.4.1.2272.30; www.cisco.com/xxxx/comm_protocol.html." This indicates to network element detection system 12 that the communication protocol may be accessed by downloading a file stored at the URL. Thus, network element detection system 12 can automatically retrieve the communication protocol.

Once the communication protocol is obtained at step 118, database 30 is updated to include the network element identifier and the corresponding communication protocol at step 120.

Whether the communication protocol is obtained from database 30 or obtained at step 118, flow proceeds to step 122 where the polling engine 16 uses the communication protocol to retrieve network element information from the network element. The network element information includes device-level information such as location of the device, device serial number, circuit identifier, etc. The network element information also includes port-level information such as the IP address of an end device connected to a port (e.g., IP address of printer 28 connected to hub 26), status of a port (link, no link, disabled), traffic byte count (if linked), etc.

Once obtained, the network element information is stored in database 30 at step 124. The collection of network element information from each network element provides a record of the status of network 20 at any point in time including the various network traffic devices and port connections to end devices.

The polling engine 16 may be implemented on a single server as shown in FIG. 1 or may be implemented in a distributed fashion across multiple workstations connected to network 20. In the distributed polling engine embodiment, each polling engine provides network element information to central database 30 so that a complete representation of the network 20 is developed.

As network elements are added to or removed from network 20, database 30 creates a new record of the status of the network thereby preserving past network information. The database 30 contains a history of where network elements have been connected on network 20 and where network elements are currently connected on the network 20. This history is helpful when troubleshooting duplicate IP type issues. This information is also helpful to network troubleshooters in diagnosing network element and end device issues by tracking connectivity history.

The documentation engine 18 provides network documentation to requesters. A request for network documentation may originate with a user at personal computer 42 over network 40 or from personal computer 27. The documentation engine 18 receives the request and retrieves the appropriate information from database 30. The request may include search terms relating to a particular network aspect such as a geographic portion of network 20 (e.g., all network elements in a facility) or one type of network element (e.g., all routers). The documentation engine 18 generates network documentation in a viewable and downloadable format (e.g., a pdf file) which is viewed and/or retrieved by the requestor.

FIG. 3 depicts exemplary network documentation including a header 202 and port information 204. The header 202 provides information concerning the network element such as physical location, various IP address, circuit IDs, etc. Port information 204 includes a port identifier, a text reference to the device connected to the port and an IP address of the device connected to the port.

Rather than the text format shown in FIG. 3, the network documentation may be presented in a graphical format presenting a graphical representation of the network elements and the associated connections to other network elements. A combined graphical and textual format may also be used for the network documentation.

As described above, the present invention can be embodied in the form of computer-implemented processes and apparatuses for practicing those processes. In an exemplary embodiment, the invention is embodied in computer program code executed by the network element detection system. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of detecting network information comprising:

generating a polling command and issuing said polling command to a network element;

receiving a network element identifier generated by said network element in response to said polling command;

accessing a database and determining whether said network element identifier is present in said database;

obtaining a communication protocol for said network element in response to accessing said database, said obtaining said communication protocol includes retrieving said communication protocol from a third party if said network element identifier is not present in said database, wherein retrieving said communication protocol from said third party includes automatically accessing a URL provided in said network element identifier;

using said communication protocol to retrieve network element information from said network element; and storing said network element information in said database.

2. The method of claim 1 wherein:
said obtaining said communication protocol includes retrieving said communication protocol from said database if said network element identifier is present in said database.

3. The method of claim 1 wherein:
said network element information includes port-level information.

4. The method of claim 3 wherein:
wherein said network element is a network traffic device, said port-level information including au IP address of end device coupled to a port of said network traffic device.

5. The method of claim 3 wherein:
said port-level information includes port status.

6. The method of claim 3 wherein:
said port-level information includes traffic byte count 7. The method of claim 1 wherein:
said communication protocol includes commands for accessing said network element information.

8. The method of claim 1 further comprising:
generating network documentation containing said network element information.

9. The method of claim 8 further comprising:
downloading said network documentation to a requestor.

10. A system for detecting network information comprising:
a database containing network element information;
a network element detection system including a polling engine generating a polling command and issuing said polling command to a network element, wherein said polling engine is implemented on a single server or across multiple workstations connected to a network;
said polling engine receiving a network element identifier generated by said network element in response to said polling command;
said polling engine accessing said database and determining whether said network element identifier is present in said database; said polling engine obtaining a communication protocol for said network element in response to accessing said database, said obtaining said communication protocol includes retrieving said communication protocol from a third party if said network element identifier is not present in said database, wherein retrieving said communication protocol from said third party includes automatically accessing a URL provided in said network element identifier;
said polling engine using said communication protocol to retrieve network element information from said network element; and
said polling engine storing said network element information in said database.

11. The system of claim 10 wherein:
said network element information includes port-level information.

12. The system of claim 11 wherein:
wherein said network element is a network traffic device, said port-level information including an IP address of end device coupled to a port of said network traffic device.

13. The system of claim 11 wherein:
said port-level information includes port status.

14. The system of claim 11 wherein:
said port-level information includes traffic byte count.

15. The system of claim 10 wherein:
said communication protocol includes commands for said polling engine to access said network element information.

16. The system of claim 10 wherein:
said network element detection system includes a documentation engine generating network documentation containing said network clement information.

17. The system of claim 16 wherein:
said documentation engine downloads said network documentation to a requestor.

18. A computer program product for detecting network information, the computer program product comprising:
a storage medium readable by a processing circuit and storing instructions for execution by the processing circuit for performing a method comprising:
generating a polling command and issuing said polling command to a network element;
receiving a network element identifier generated by said network element in response to said polling command;
accessing a database and determining whether said network element identifier is present in said database;
obtaining a communication protocol for said network element in response to accessing said database, said obtaining said communication protocol includes retrieving said communication protocol from a third party if said network element identifier is not present in said database, wherein retrieving said communication protocol from said third party includes automatically accessing a URL provided in said network element identifier;
using said communication protocol to retrieve network element information from said network element; and
storing said network element information in said database.

\* \* \* \* \*